(12) United States Patent
Jaiswal et al.

(10) Patent No.: US 10,027,722 B2
(45) Date of Patent: Jul. 17, 2018

(54) COMMUNICATION TRANSACTION CONTINUITY USING MULTIPLE CROSS-MODAL SERVICES

(71) Applicant: International Business Machines Corporation, Armonk, NY (US)

(72) Inventors: Peeyush Jaiswal, Boca Raton, FL (US); Slobodan R. Sipcic, Bethesda, MD (US); Tapas K. Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 14/150,907

(22) Filed: Jan. 9, 2014

(65) Prior Publication Data
US 2015/0195310 A1 Jul. 9, 2015

(51) Int. Cl.
*H04L 29/06* (2006.01)

(52) U.S. Cl.
CPC .............................. *H04L 65/1083* (2013.01)

(58) Field of Classification Search
CPC ............. G06K 19/0723; G06Q 20/341; G06Q 20/352; G06Q 20/40145; G06Q 20/385;
(Continued)

(56) References Cited

U.S. PATENT DOCUMENTS 5,822,405 A * 10/1998 Astarabadi .......... H04M 1/6505
379/352

6,026,379 A * 2/2000 Haller .................... G06Q 20/00
705/34
(Continued)

FOREIGN PATENT DOCUMENTS

CN      101730290 A  *  6/2010  ................... 713/176
CN      101742592 A     6/2010
(Continued)

OTHER PUBLICATIONS

"Smartcard-Web-Server", Sep. 2013, Open Mobile Alliance (OMA), (101 pages total).*
(Continued)

*Primary Examiner* — Vivek Srivastava
*Assistant Examiner* — Todd L Barker
(74) *Attorney, Agent, or Firm* — Alexander G. Jochym

(57) ABSTRACT

A computer receives a global command from a communication device using a first communication mode associated with a transaction. The computer stores transaction data, wherein the transaction data is stored for at most a duration of a session life span (SLS) time interval that is predefined. The computer sends a transfer session identifier (TSI) key to the communication device using the first communication mode. The computer receives the TSI key from the first communication device or a second communication device, using at least a second communication mode. The computer associates the transaction data with at least the second communication mode and the first communication mode in parallel, and the computer performs the transaction by use of either or both of the first communication mode and at least the second communication mode, within the SLS time interval that is pre-defined.

20 Claims, 4 Drawing Sheets

(58) Field of Classification Search
CPC .. G06Q 20/425; G06Q 20/32; G06Q 20/3278; G06Q 20/3255; G06Q 20/20; G06Q 20/204; G06Q 20/322; G06Q 20/3274; G06Q 30/0601; G06Q 20/401; G06Q 20/02; G06Q 20/04; G06Q 20/12; G07F 7/1008; G07F 7/0886; H04L 67/14; H04L 63/083; H04L 63/0815; H04L 63/0869; H04L 63/08; H04L 63/18; H04L 2463/102; H04L 63/166; H04L 65/1083; H04M 3/4938; H04M 1/72547; H04M 1/72561; G06C 20/127; G06C 20/20; G06C 20/32; G06C 20/363; H04W 4/005
See application file for complete search history.

(56) References Cited

U.S. PATENT DOCUMENTS

| | | | | |
|---|---|---|---|---|
| 6,182,052 | B1* | 1/2001 | Fulton | G06Q 10/02 705/26.8 |
| 7,251,733 | B2* | 7/2007 | Haverinen | H04L 29/06 713/179 |
| 7,454,368 | B2* | 11/2008 | Stillman | G06Q 30/06 705/26.35 |
| 7,967,196 | B1* | 6/2011 | Bierbaum | G06Q 20/127 235/375 |
| 8,000,320 | B2 | 8/2011 | Loghmani | |
| 8,005,426 | B2* | 8/2011 | Huomo et al. | 455/41.2 |
| 8,055,285 | B2* | 11/2011 | Mamdani | G06Q 20/04 455/412.1 |
| 8,346,677 | B1* | 1/2013 | Markarian | G06Q 30/0601 340/5.41 |
| 8,380,177 | B2* | 2/2013 | Laracey | G06Q 30/0253 370/259 |
| 8,433,914 | B1* | 4/2013 | Philpott | H04L 9/3215 713/176 |
| 8,571,939 | B2* | 10/2013 | Lindsey et al. | 705/17 |
| 8,740,064 | B2* | 6/2014 | Griffin et al. | 235/379 |
| 8,767,945 | B2* | 7/2014 | Simoes | H04M 3/5191 379/265.02 |
| 8,914,302 | B2* | 12/2014 | Rose et al. | 705/17 |
| 8,954,744 | B2* | 2/2015 | Sherkin et al. | 713/176 |
| 9,064,247 | B2* | 6/2015 | Baer | G06Q 20/227 |
| 9,225,532 | B2* | 12/2015 | Counterman | H04L 9/3271 |
| 2003/0055785 | A1* | 3/2003 | Lahiri | G06Q 20/04 705/41 |
| 2003/0081744 | A1* | 5/2003 | Gurfein | H04M 3/493 379/93.13 |
| 2003/0149662 | A1* | 8/2003 | Shore | G06Q 20/04 705/39 |
| 2004/0030601 | A1* | 2/2004 | Pond | B67D 7/145 705/16 |
| 2005/0055403 | A1* | 3/2005 | Brittan | H04L 29/06 709/206 |
| 2005/0259673 | A1* | 11/2005 | Lu | H04W 92/08 370/419 |
| 2006/0136638 | A1* | 6/2006 | Banning | G06F 9/505 710/244 |
| 2007/0174386 | A1* | 7/2007 | Loghmani | H04L 63/083 709/203 |
| 2007/0179978 | A1* | 8/2007 | Lee | G06Q 30/06 |
| 2007/0220275 | A1* | 9/2007 | Heitzeberg | H04L 63/08 713/186 |
| 2008/0294608 | A1* | 11/2008 | Madhukar | H04M 3/02 |
| 2009/0192944 | A1* | 7/2009 | Sidman | G06Q 20/401 705/75 |
| 2009/0279506 | A1 | 11/2009 | Sinnreich et al. | |
| 2010/0074155 | A1 | 3/2010 | Park et al. | |
| 2011/0003585 | A1 | 1/2011 | Wang et al. | |
| 2012/0011009 | A1* | 1/2012 | Lindsey | G06Q 20/20 705/17 |
| 2013/0086649 | A1* | 4/2013 | Battistello | H04W 12/06 726/4 |
| 2013/0092741 | A1* | 4/2013 | Loh et al. | 235/492 |
| 2013/0204785 | A1* | 8/2013 | Monk | G06Q 20/322 705/44 |
| 2013/0268437 | A1* | 10/2013 | Desai | G06Q 20/08 705/41 |
| 2013/0305036 | A1* | 11/2013 | Vos | H04L 63/166 713/151 |
| 2014/0236842 | A1* | 8/2014 | Salminen et al. | 705/75 |
| 2015/0106456 | A1* | 4/2015 | van Hoek | H04W 4/12 709/206 |
| 2015/0120512 | A1* | 4/2015 | Chen | G06Q 30/0641 705/27.1 |
| 2015/0186871 | A1* | 7/2015 | Laracey | G06Q 20/3278 705/41 |
| 2016/0026991 | A1* | 1/2016 | Murdoch | H04W 12/06 705/44 |
| 2016/0239817 | A1* | 8/2016 | Chene | G06Q 20/20 |

FOREIGN PATENT DOCUMENTS

| | | | |
|---|---|---|---|
| WO | 03056859 A2 | 7/2003 | |
| WO | 2006084503 A1 | 8/2006 | |
| WO | WO 2006/105287 | * 10/2006 | H04M 1/64 |

OTHER PUBLICATIONS

Maes, Stéphane H., "Multi-Modal Browser Architecture—Overview on the support of multi-modal browsers in 3GPP", IBM Research—Mobile Speech Solutions and Conversational Multimodal Computing, W3C Multimodal Interaction Working Group 9 (2001): 1-25.

"Evolving to Converged Communication with Session Initiation Protocol (SIP)", Avaya, IP Telephony, White Paper, Feb. 2006, <avaya.com>.

* cited by examiner

COMMUNICATION TRANSACTION CONTINUITY USING MULTIPLE CROSS-MODAL SERVICES

BACKGROUND OF THE INVENTION

The present invention relates generally to the field of communications, and more particularly to changing communication modes or communication channels to complete a current transaction.

Rapidly advancing IT devices and capabilities are raising expectations from business customers. Customers have come to expect 24/7 availability of transactions and support, and expect to conduct transactions and receive support using communication devices and channels of their choice. In recognition of the expectations and varied preferences of customers, many businesses have responded by broadening customer access points, offering access that requires the support of multiple modes of communication.

The response by businesses offers flexibility, but customer access points remain as fundamentally fragmented services positioned in various functional "silo" areas of the business, capturing data, but lacking integration of service. The lack of integration of customer communication solutions results in potential inconsistency of customer service experience, information, and a mixed business message.

Some businesses have embraced pervasive communication solutions providing integrated access points for customers offering a selection of modes and channels that includes a consistency of customer service; however, customer transactions are still required to start and finish using the same communication mode or communication channel for transactions within a session.

SUMMARY

Embodiments of the present invention disclose a method, computer program product, and system for using multiple communication modes during a transaction. A computer receives a global command from a communication device using a first communication mode associated with a transaction. The computer stores transaction data, wherein the transaction data is stored for at most a duration of a session life span (SLS) time interval that is predefined. The computer sends a transfer session identifier (TSI) key to the communication device using the first communication mode. The computer receives the TSI key from the first communication device or a second communication device, using at least a second communication mode. The computer associates the transaction data with at least the second communication mode and the first communication mode in parallel, and the computer performs the transaction by use of either or both of the first communication mode and at least the second communication mode, within the SLS time interval that is pre-defined.

DETAILED DESCRIPTION

Figure 1:
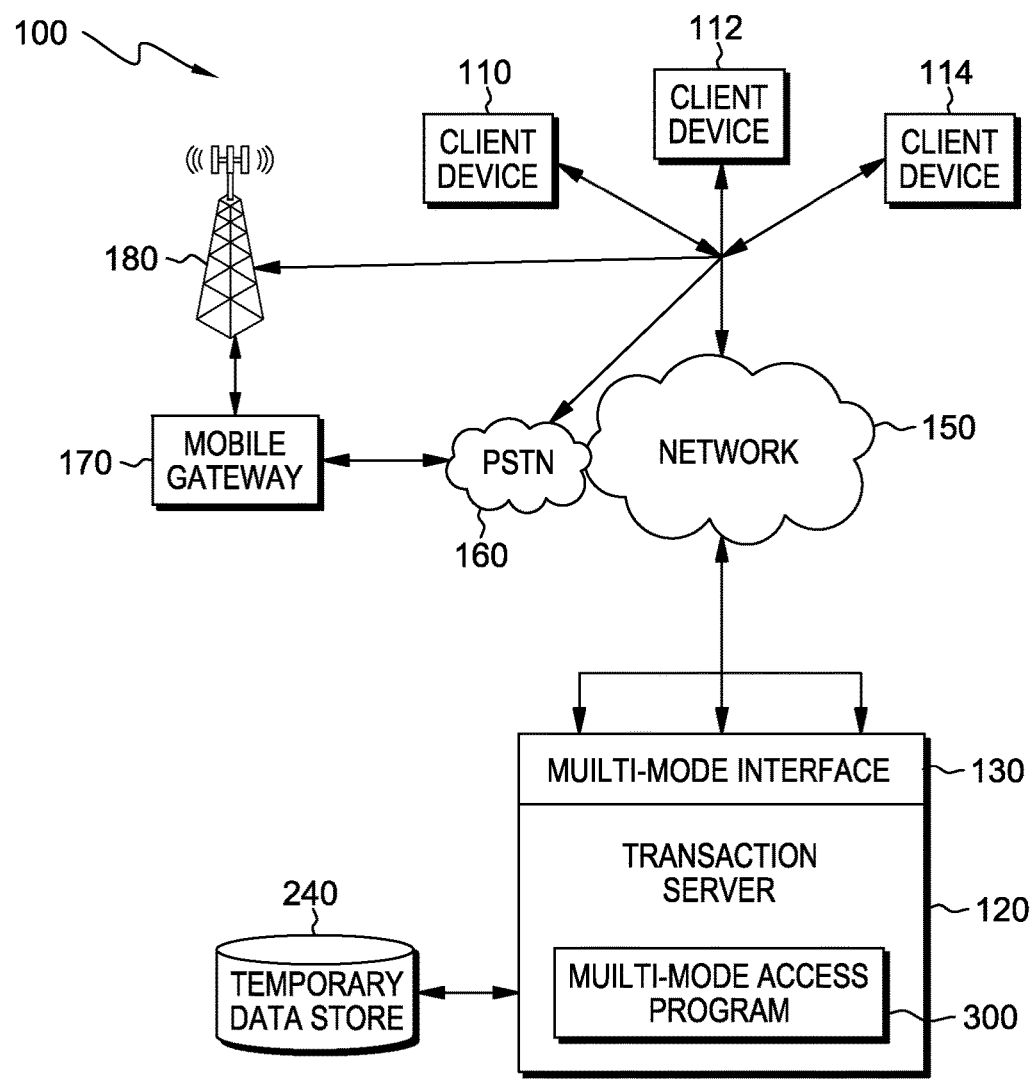
FIG. 1 is a functional block diagram illustrating a communication environment, in accordance with one embodiment of the present invention.

Embodiments of the present invention recognize that electronic transactions between customers and businesses having pervasive multi-modal access points, enables a customer's use of multi-mode communication during an electronic transaction by the initiation of a global command from the customer's client device. The enablement of multiple communication modes includes maintaining the transaction data from multiple parallel communication modes engaged by the customer during the transaction. The session and transaction data from parallel modes are temporarily stored in memory during the transaction until the transaction is complete or abandoned, in which the expiration of a pre-defined session life span time period is exceeded and results in the deletion of the stored, partially complete, transaction data.

In this manner the transaction can be completed without restarting, preserving completed transaction data, and the user can make use of multiple parallel communication modes to facilitate the transaction or respond to environmental conditions, such as excessive noise or privacy concerns. The transaction data is temporarily stored only after the customer initiated global command is received by a global application programming interface, to enable the multiple parallel communication modes, thus limiting storage requirements and avoiding data privacy retention issues.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed communication environment, generally designated 100, in accordance with one embodiment of the present invention. Distributed communication environment 100 includes transaction server 120, client devices 110, 112, and 114, transmission tower 180, mobile gateway 170, public switched telephone network (PSTN) 160, all interconnected through network 150. Transaction server 120 also includes multi-mode access program 300 and multi-mode interface 130. In an exemplary embodiment of the present invention, multi-mode interface 130 of transaction server 120 includes, but is not limited to, a wireless interface, a web interface, an SMS interface, a voice interface, and an application media interface. Transaction server 120 also is operationally coupled to temporary data store 240.

In an exemplary embodiment of the present invention, client devices 110, 112, and 114 are communication enabled devices that can be a land-line phone, a mobile phone, a smart-phone or personal digital assistant (PDA). Client devices 110, 112, and 114, when properly configured, can also be network connected computing devices such as, but not limited to laptop computers, netbook computers, desktop computers, or tablet computers, using communication protocols over network 150, such as voice over Internet Protocol (VoIP) technology, which uses the Internet for transmission of communications. Client devices 110, 112, and 114 can be any programmable digital device capable of transmitting and receiving one or more of a plurality of communication types, over network 150. The communication types may include, but are not limited to: audio communications (voice), short message service (SMS) messages, emails, web browsers, wireless access to network resources, and media applications designated to perform specific functions, services, or transactions. Client devices 110, 112, and 114, represent a multiplicity of electronic devices that are capable to establish a connection to transaction server 120 via network 150 using one of multiple available connection modes.

Transmission tower 180 is one of a plurality of transmission towers used to support wireless phone communications and data transmission to mobile devices. Transmission tower 180 receives communications from client devices 110, 112, and 114, and ultimately connects the communication transmission to network 150 that in turn may submit the communications to transaction server 120, for example.

Mobile gateway 170 is a mobile switching center which provides a connection from mobile service network to PSTN 160. Mobile gateway 170 enables wireless connection from client devices 110, 112, and 114, to transaction server 120 utilizing one or more modes of communication connection, such as voice, web access, SMS, email, or by operational use of a transaction-specific application.

Network 150 is illustrated as interconnected to public switched telephone network (PSTN) 160, which consists of telephone lines, fiber optic cables, microwave transmission links, cellular networks, communications satellites, undersea telephone cables, and other devices, all inter-connected by switching centers, thus allowing any telephone in the world to communicate with any other. Network 150 can be, for example, a local area network (LAN), a wide area network (WAN), the Internet, a cable network, a fiber optic network, or a wireless network or any other network or combinations of networks that connect the telecommunication devices of distributed communications environment 100. In general, network 150 can be any combination of connections and protocols that will support communications between transaction server 120, transmission tower 180, mobile gateway 170, PSTN 160 and client devices 110, 112, and 114.

Transaction server 120 is a server computer accessible to other electronic and computing devices, such as client devices 110, 112, and 114, by multiple communication modes and channels. A communication mode is the type of communication or "how" the communication is made, such as by audio, text, video, or images. A communication channel is the underlying technologies and protocols enabling the mode of communication, such as wireless markup language (WML), voice extensible markup language (VoiceXML), hypertext markup language (HTML), extensible markup language (XML), and short message service (SMS). Hereafter, references are made to "communication mode" for brevity, however, it is understood that embodiments of the present invention apply similarly to communication channels as well.

In one embodiment of the present invention, transaction server 120 is shown to include multi-mode interface 130, which may include for example, a voice interface, a web interface, and wireless interface. A voice interface enables transaction server 120 to establish connections with electronic devices using a voice communication mode. Using a combination of audio content recognition and dual tone multi-frequency (DTMF) codes, can receive input from client devices 110, 112, and 114, conduct one or more transactions, and output audio replies as appropriate. In other embodiments, additional communication mode interfaces may be used, and in still other embodiments, the communication mode interfaces may be collectively associated within a global application programming interface that receives the global command and/or a transfer session indicator key (discussed with respect to FIG. 2). The global application programming interface detects the communication mode from which the global command or transfer session indicator is received, and connects to the appropriate application programming interface associated with the communication mode used.

A web interface enables transaction server 120 to establish connections with client devices 110, 112, and 114 using web access capability, such as a web browser. Client devices 110, 112, and 114, access web content hosted on or operationally coupled to transaction server 120 and conduct one or more transactions. Having connected to web content accessible via transaction server 120, client devices 110, 112, and 114, are able to submit and receive information to complete a transaction. Additional details regarding multi-mode interface 130 are discussed with respect to FIG. 2.

Multi-mode access program 300 is accessible to and operated by transaction server 120, and provides customers connecting to transaction server 120 via one mode of communication, access to initiate a global command to enable multiple communication modes during a transaction between one or more client devices, such as client devices 110, 112, 114, and transaction server 120. In one embodiment of the present invention, multi-mode access program 300 utilizes a global API across the multiple modes of communication available to transaction server 120 and a global command initiated by a customer using a client device, such as client device 110. The client device connects with transaction server 120 establishing a session, in which an electronic transaction may be conducted. Multi-mode access program 300 enables the client device to begin a transaction using one mode of communication and by initiating the global command, enable multiple modes of communication to be actively available, in parallel, to the customer during the transaction session, with data from all communication modes received and associated with the transaction, and without loss of session progress or session data if the transaction is interrupted.

Temporary data store 240 is operationally coupled with transaction server 120. Temporary data store 240 provides data storage resources for multi-mode access program 300 to temporarily store data associated with a transaction session to maintain and retain the data and continued progress associated with the transaction using multiple communication modes. This enables convenience of data access and entry for completing the transaction and protects the transaction data and progress, avoiding the need to restart the transaction session or redo previously completed portions of the transaction session, if the transaction is interrupted.

Figure 2:
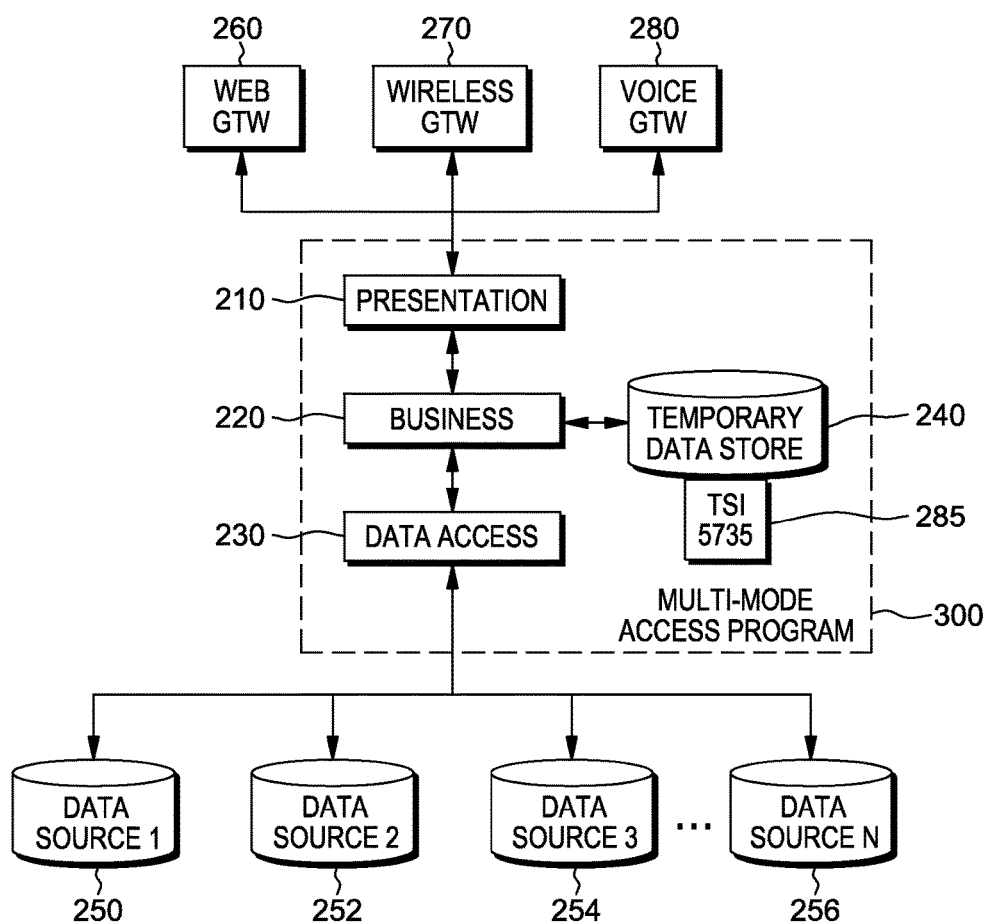
FIG. 2 is a block diagram depicting a multi-mode access program and accessible resources, within the communication environment of FIG. 1, in accordance to an embodiment of the present invention.

FIG. 2 is a block diagram depicting a multi-mode access program and accessible resources, within the communication environment of FIG. 1, in accordance to an embodiment of the present invention. FIG. 2 represents one possible set of resources and architecture of embodiments of the present invention, however, other resources and architectures are possible, while remaining consistent with embodiments of the present invention.

In an embodiment of the present invention, multi-mode access program 300 is an application for enabling multiple communication modes available to customers to use in parallel, during a transaction within a session. The multiple communication modes are active once a global command is initiated by a customer accessing transaction server 120. Multi-mode access program 300 is depicted as including presentation layer 210, business logic layer 220 and data access layer 230 as well as, temporary data store 240. In one embodiment of the present invention, data access layer 230 is an application module of multi-mode access program 300, providing read/write functions to various data sources, which are depicted by data sources 250, 252, 254, and 256. Data access layer 230 includes session data and transaction data associated with customers communicating with transaction server 120 via one or more of client devices 110, 112, and 114.

Business logic layer 220 is an application module that includes transactional information and steps that may be conducted via one or more presentation modes during a session. Business logic layer 220 is dependent upon retrieving transaction and session data from and writing transaction and session data to, data access layer 230. Business logic layer 220 has access to temporary data store 240, which is used to store the session and transaction data from the multiple communication modes used by the customer, once the global command is received, during a transaction between a client device, such as client device 110, and transaction server 120. The session information, transaction steps completed, data viewed, requested and/or received, and data that has been input, across the multiple parallel communication modes, are stored on temporary data store 240. In one embodiment of the present invention, the information and data stored for the multi-step transaction that is incomplete, remains accessible in storage until the interrupted transaction is re-establish using one or more of the multi-communication modes available. In such cases the customer proceeds with pending transaction steps, or in another embodiment, the stored data associated with the transaction, remains available until a pre-defined period of time, referred to as a session life span (SLS), has expired without determining that the transaction has been re-established using at least one of the available multiple communication modes.

Presentation layer 210 is a component of multi-mode access program 300 that structures the business logic and data into formats appropriate for specific communication modes. Presentation layer 210 is dependent upon the business logic layer content of sessions and by association, dependent upon the data access layer retrieving and writing data associated with the session and transactions. Presentation layer 210 uses various communication channels to enable the multiple communication modes. A communication channel is the way by which the content of the communication is created and enabled. The mode of a communication is how the communication is delivered or exchanged. For example, a communication may be exchanged by using a web browser to access a web page on the Internet, which receives input and provides output. This can be described as a web mode of communication. The communication channel may be the use of hyper text markup language (HTML) which is the main markup language used to create web pages. In another example, a voice communication to a server enabled with a voice response unit uses a voice mode of communication using VoiceXML as a digital document standard for interactive media and voice dialogs between humans and computers. VoiceXML is a channel of an audio or voice communication mode. Presentation layer 210 connects client devices 110, 112 and 114 accessing multi-mode access program 300 on transaction server 120 via network 150, to sessions and transactions by way of connecting to a global application programming interface that detects the mode of communication used by client communication devices, such as client devices 110, 112, and 114, and directs the connection to the appropriate application programming interface (API) for the communication mode used.

Web gateway (GTW) 260 is the application programming interface of multi-mode access program 300 enabling a wireless communication mode with client devices 110, 112 and 114. For example, a client device, such as client device 112, may use a browser to access transaction server 120 via the Internet by means of interactive web-based content. Web GTW 260 uses HTML as a channel for the web-based communication mode. HTML is used by browsers to interpret and compose text, images and other material into visual or audible web pages.

Wireless GTW 270 is the application programming interface of multi-mode access program 300 enabling communication with client devices 110, 112 and 114 using wireless technology. Wireless GTW 270 may use wireless markup language (WML) as a channel for the web communication mode. WML is a markup language based on XML that is intended for devices that implement the Wireless Application Protocol (WAP) specification, such as mobile phones. It provides navigational support, data input, hyperlinks, text presentation, image presentation, and forms, much like HTML. Alternatively, mobile client devices may use HTML itself or extensible HTML (XHTML) as a supporting channel with the WAP specification. For example, wireless GTW 270 enables wireless texting communications between transaction server 120 and a client device, such as client device 112. Short message service (SMS) is a text messaging service component of mobile phone devices and wireless GTW 270 provides the interface for a wireless presentation of communications that receives text messages and dual tone multi-frequency (DTMF) codes from client devices 110, 112 and 114 and sends text messages to clients in return. Voice GTW 280 is the application interface of multi-mode access program 300 enabling presentation of voice communications between transaction server 120 and client devices, such as client device 114. Voice GTW 280 may be associated with voice recognition technology that determines selections from digitized audio input, and can provide voice responses from computer-generated words or pre-recorded voice response.

In another embodiment of the present invention, application programming interfaces supporting different communication modes may be integrated into a global application programming interface. A global application programming interface receives communication and recognizes the communication mode, and assigns the communication to the appropriate application interface to begin a session and conduct transactions. A global application programming interface for multi-modal communication enables developers of applications to include the ability to enable multiple modes of communication during a communication session and retain the data received and transaction progress completed. Offering multiple communication modes gives flexibility to customers to match a communication mode to the needs of the activity performed, the convenience of available devices, conditions of a changing environment, or to receive output in a more appropriate format.

Client devices 110, 112 and 114 connecting to servers that provide online services, such as transaction server 120, initially undergo device identification and user authentication, to initiate a session in which one or more transactions may be performed by a user of the client device. Embodiments of the present invention assume separate and successful identification and authentication are complete and begin with the initiation of a session offering a transaction over a selected communication mode. A transaction refers to a multi-step electronic transaction in which the client device interacts with content available via one or more of the multiple communication modes, typically involving speaking, viewing, texting, listening, selection, input by typing or touching, displaying, and/or receipt of data. A transaction is considered "in-progress" if the transaction has been initiated and not been completed, and if a session life span (SLS) time interval associated with enabling multiple parallel communication modes by a global command, has not expired.

In one embodiment of the present invention, a customer using a client device and a first communication mode to perform a transaction, after initiating the global command may elect to include at least a second communication mode to continue performing the transaction, and possibly more communication modes. Because initiation of the global command has made multiple communication modes available, the client device may select alternate communication modes to perform transaction activities without having to terminate one mode, save transaction data, initiate another communication mode, retrieve transaction data, and proceed with the transaction. Instead, the customer may select at least a second available communication mode in parallel with the first communication mode, and use a transfer session indicator to associate at least the second communication mode to the current session and transaction. The customer may continue to perform the transaction using any communication mode or combination of communication modes that have been associated with the session and transaction by use of the transfer session indicator.

Embodiments of the present invention enable the flexible use of one or more communication modes in parallel to perform communication-based transactions. The receipt of a global command enables the multiple communication modes. The receipt of a transfer session indicator by way of a specific communication mode, associates the specific communication mode with the current transaction. The availability of multiple communication modes enables a customer to select different communication modes if communication modes are not available or are not suitable for completion of the electronic transaction in progress.

Transfer session indicator (TSI) 285 is an identification key that associates a communication mode with a transaction. In one embodiment of the present invention the TSI key is a small integer that is easy to recognize and remember, for example in one embodiment of the present invention, the TSI key may be a four to six digit integer, similar to those used for personal identification numbers or PINs, but in another embodiment, the TSI key may be an integer comprised of one to ten digits. In still other embodiments, the TSI key may be a string of characters. TSI 285 is generated by multi-mode access program 300 when a global command to enable multiple communication modes is received. TSI 285 is associated with the current session and transaction information as it is temporarily saved in temporary data store 240, and is sent to the client device communicating with multi-mode access program 300 via transaction server 120.

In an exemplary embodiment, a customer using client device 110 may connect with transaction server 120 using a voice connection through voice GTW 280, via network 150, and after authenticating and initiating a session, may begin a transaction. The customer user of client 110 initiates the global command which enables multiple communication modes with transaction server 120 and multi-mode access program 300. Client device 110 receives TSI 285 which identifies the current session and transaction as client device 110 connects with additional communication modes that are available. The customer using client device 110 wishes to view product offerings and using an additional client device, such as client device 112, opens a browser, connects to transaction server 120. The customer uses TSI 285 to connect the browser communication mode to the current session and transaction. The current transaction continues using the browser communication mode in parallel with a voice communication mode. The customer wishes to make a purchase, but experiences a change in environment in which the noise level has increased significantly, making voice mode transactions difficult. The environment also includes many individuals nearby in view of client device 112's browser screen. Not wanting to share private information, the customer uses client device 110, taking action to terminate the voice communication mode, and uses TSI 285 to initiate an SMS communication mode on client device 110 to complete the purchase transaction. After the purchase is acknowledged to be complete, the session remains active awaiting a selection by the customer in which another transaction is initiated or the session is terminated.

TSI 285 is used as a simple key to identify the session and transaction in progress at the time that the global command to enable multiple communication modes was received. TSI 285 is also used to recover the information and data associated with continuing the session and the step of the transaction in progress, should the transaction or session be inadvertently interrupted.

Figure 3:
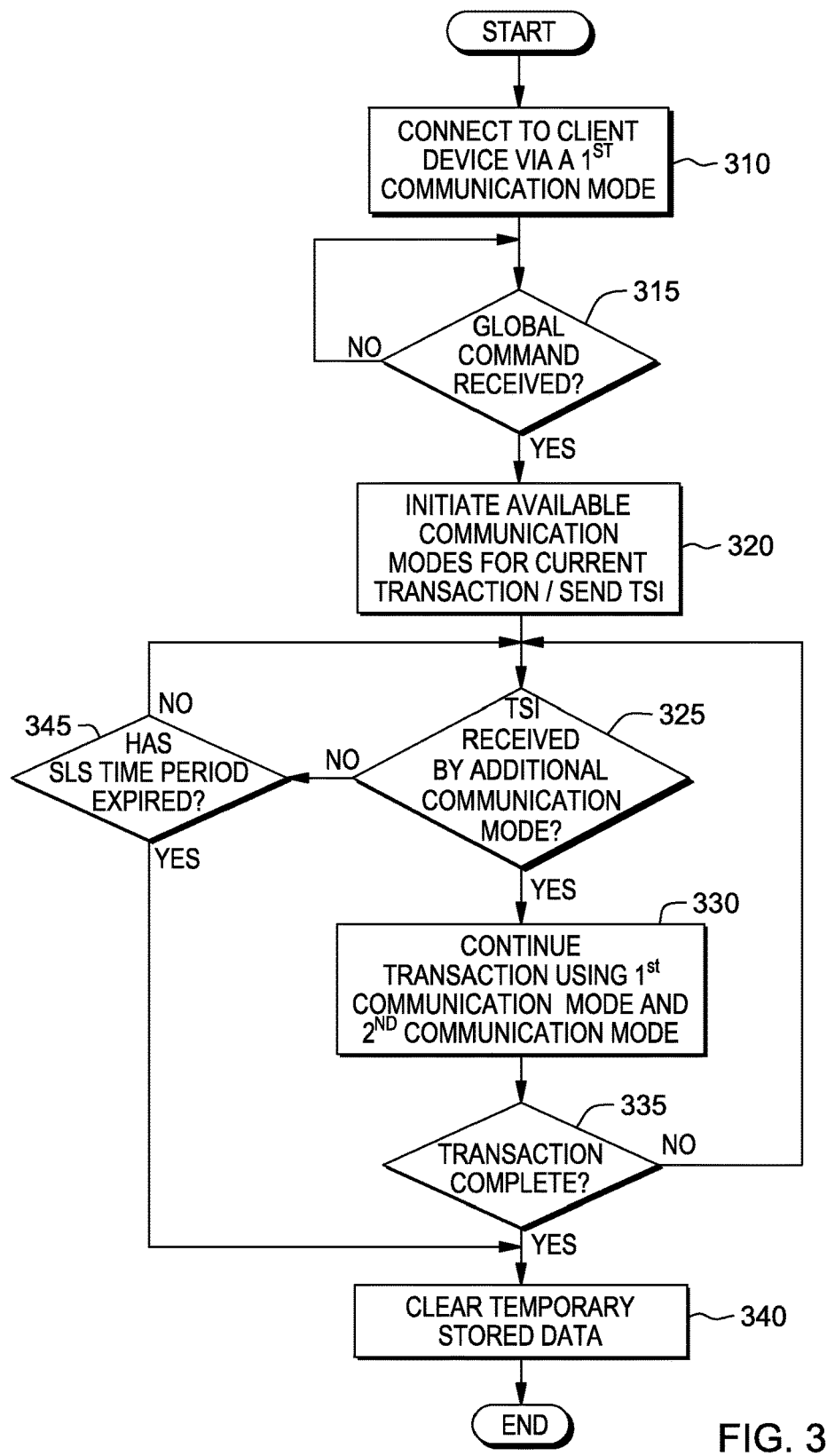
FIG. 3 is a flowchart depicting the operational steps of a multi-mode access program, accessible by a transaction server within the communication environment of FIG. 1, in accordance with an embodiment of the present invention.

FIG. 3 is a flowchart depicting the operational steps of multi-mode access program 300, accessible by a transaction server within the communication environment of FIG. 1, in accordance with an embodiment of the present invention. A client device requests a session and/or transaction, hereafter referred to as a/the transaction, and authenticates with transaction server 120.

Multi-mode access program 300 receives a communication from a client device connecting the client device via a first communication mode (step 310). The first communication mode may be any communication mode which is supported by multi-mode access program 300 and the communication, using a first communication mode, is received by a global API. The global API determines the appropriate communication mode API and connects the client device communication to the appropriate API. Multi-mode access program 300 obtains information corresponding to the requested session/transaction and presents the information to the client device formatted for the first communication mode used by the client device. The client device proceeds with the transaction.

For example, client device 110, using a voice communication mode, calls a number that connects client device 110 to transaction server 120 and a global API that directs the connection using a voice communication mode to voice GTW 280 API and is greeted by a voice response unit, which is part of presentation layer 210 for the voice communication mode.

Having connected to the client device via a first communication mode, multi-mode access program 300 monitors to determine if a global command is received (decision step 315). The client device, such as client device 110, can initiate the global command using the first communication mode, to enable multiple communication modes for the current transaction. Multi-mode access program 300 monitors to determine if the global command is received.

Having determined that the global command has been received (step 315, "YES" branch), multi-mode program 300 enables the available communication modes for the current transaction, and sends a TSI to the client device (step 320). For example, having received the global command through voice GTW 280 API (FIG. 2), and analyzing the global command by presentation layer 210 and business layer 220, multi-mode access program 300 enables web GTW 260 API and wireless GTW 270 API for the current transaction. Multi-mode access program 300 sends a TSI, such as TSI 285, to the client device that initiated the global command using the first communication mode, from which the client device requested the session/transaction.

If multi-mode access program 300 determines that a global command was not received (step 315, "NO" branch), multi-mode access program 300 continues to monitor for receipt of a global command.

Having sent a TSI to the client device initiating the global command, multi-mode access program 300 determines if the TSI is received by one of the additional communication modes (decision step 325). The global command has enabled the available multiple communication modes through the various APIs. Multi-mode access program 300 determines whether the TSI for the current transaction is received by any of the enabled communication mode APIs. For a communication mode to be enabled and actively associated with the current transaction, the API for the particular communication mode to be used, needs to receive the TSI for the current transaction.

Having determined that the TSI was received by one or more additional communication modes (step 325, "YES" branch), multi-mode access program 300 continues the transaction with a first communication mode and a second communication mode associated with the current transaction, in parallel (step 330). For example, multi-mode access program 300 has determined that client device 110 has established a transaction using a voice connection via voice GTW 280 API, and has received a global command from client device 110. The APIs for web GTW 260 and wireless GTW 270 are enabled, and become associated with the current transaction when TSI 285 is received via the API of the chosen communication mode. Each communication mode from which TSI 285 is received is associated with the current transaction, potentially resulting in multiple communication modes actively associated with the current transaction, in parallel. Receiving TSI 285 from a browser connecting to web GTW 270 API from client device 110, multi-mode access program 300 associates the web browser communication mode with the current transaction, enabling the customer using client device 110 to use the voice communication mode and/or the web browser communication mode to proceed with the transaction.

Alternatively, client device 110 may continue with the voice communication mode associated with the current transaction, while the TSI is received from a different client device, such as client device 112, using a web browser communication mode. Both communication modes are associated with the current transaction even though they may be from different devices, such as a phone and a tablet computing device, for example.

In an exemplary embodiment, a user may choose to enable additional communication modes that facilitate the comprehension or retention of requested information, such as asking for driving directions. A user of client device 110 may request driving directions using a voice communication mode via voice GTW 280, and after initiating the global command, which may be done using DTMF codes, for example, may choose to receive the requested information using a video or image communication mode to better understand the directions displayed on a map or in the text of a document.

Multi-mode access program 300 temporarily saves the session/transaction data accrued for the transaction on temporary data store 240 for a designated time interval, and sends a TSI key to the client device. The data includes session specific information, transaction specific information, data received from the client device, data sent to the client device, all completed transaction steps, and the next step in the progression of completing the transaction. Any data input or prepared for output is also temporarily stored so that the data is available to each communication mode that becomes associated with the current transaction by receiving the TSI on one or more additional communication modes.

The transaction continues and multi-mode access program 300 determines if the transaction is complete (decision step 335). Embodiments of the present invention include transactions which may terminate in different manners. In one embodiment, the customer using a client device to connect with transaction server 120 and perform a transaction may have an activity option available to select for terminating the transaction. For example, a transaction may involve the review of information without the need for the customer to enter data. The customer may take an action to select a termination option, when done reviewing. In another embodiment, the transaction may culminate in a result that requires input by the customer, and after which no further input is required, such as completing a purchase. In this case, after confirmation of the input and result, the transaction is determined to be complete and may terminate without additional action by the customer; however, in such a case an option to begin a new transaction may be presented to the customer.

Having determined that the transaction has completed, (step 335, "YES" branch), multi-mode access program 300 clears temporary stored data (step 340). Multi-mode access program 300 determines the transaction is completed by receiving a termination action by the customer of the client devices with communication modes enabled for the current transaction. Alternatively the termination action may be the completion and confirmation of a purchase made via a communication mode enabled for the transaction on transaction server 120. Having determined the transaction to be terminated, multi-mode access program 300 clears the temporary stored data, dissociates the multiple communication modes from the current (terminated) transaction, disables the multiple communication modes, and multi-mode access program 300 ends. In one embodiment of the present invention, the communication mode used for the last transaction activity may remain enabled to request if customer user of the client device wishes to make another transaction.

Data associated with the transaction, including transaction steps, data input, and data requested, is cleared from temporary storage, and appropriate data for the transaction is stored to disk, such as data source 252 (FIG. 2). After clearing temporary stored data, multi-mode access program 300 ends.

Returning to decision step 325, having determined that a TSI has not been received by additional communication modes, (step 325 "NO" branch), multi-mode access program 300 determines if the SLS time period has expired (decision step 345). The SLS time period is a predefined period of time in which a TSI is to be received via one of the additional communication modes, or in which activity associated with the current transaction is detected.

In one embodiment of the present invention, the SLS time period is a preference setting established by an administrator role of transaction server 120. In another embodiment, customers performing a transaction receive a warning message on all enabled communication modes associated with the current transaction that the SLS time period is about to expire.

Having determined that the SLS time period has not expired (step 345, "NO" branch), multi-mode access program 300 loops back to determine if another TSI has been received by an additional communication mode (decision step 325), and proceeds as described above.

Having determined that the SLS time period has expired (step 345, "YES" branch), multi-mode access program 300 clears temporary stored data (step 340). If multi-mode access program 300 does not receive a TSI for an additional communication mode to be associated with the current transaction within the SLS time period, and no transaction activity is detected within the SLS time period, the SLS time period has expired and the current transaction is terminated. I one embodiment of the present invention, if a TSI for an additional communication mode is received, or transaction activity is detected, the SLS time period may restart. Multi-mode access program 300 clears the temporary stored data associated with the transaction, disables the multiple communication modes, and multi-mode access program 300 ends.

Returning to decision step 335, and having determined that the transaction is not complete, (step 335, "NO" branch) multi-mode access program 300 loops back to determine if an additional TSI has been received by an additional communication mode (decision step 325). Multi-mode access program 300 checks for a transaction step that produces a final result and serves as an action to terminate the transaction, or checks for an action taken by the customer using the client device to determine if a transaction terminating action has been taken. Determining that no transaction step to terminate the transaction has been made, and that no transaction terminating action has been taken, multi-mode access program 300 returns to determine if an additional TSI has been received by an additional communication mode (decision step 325), and proceeds as described above.

Figure 4:
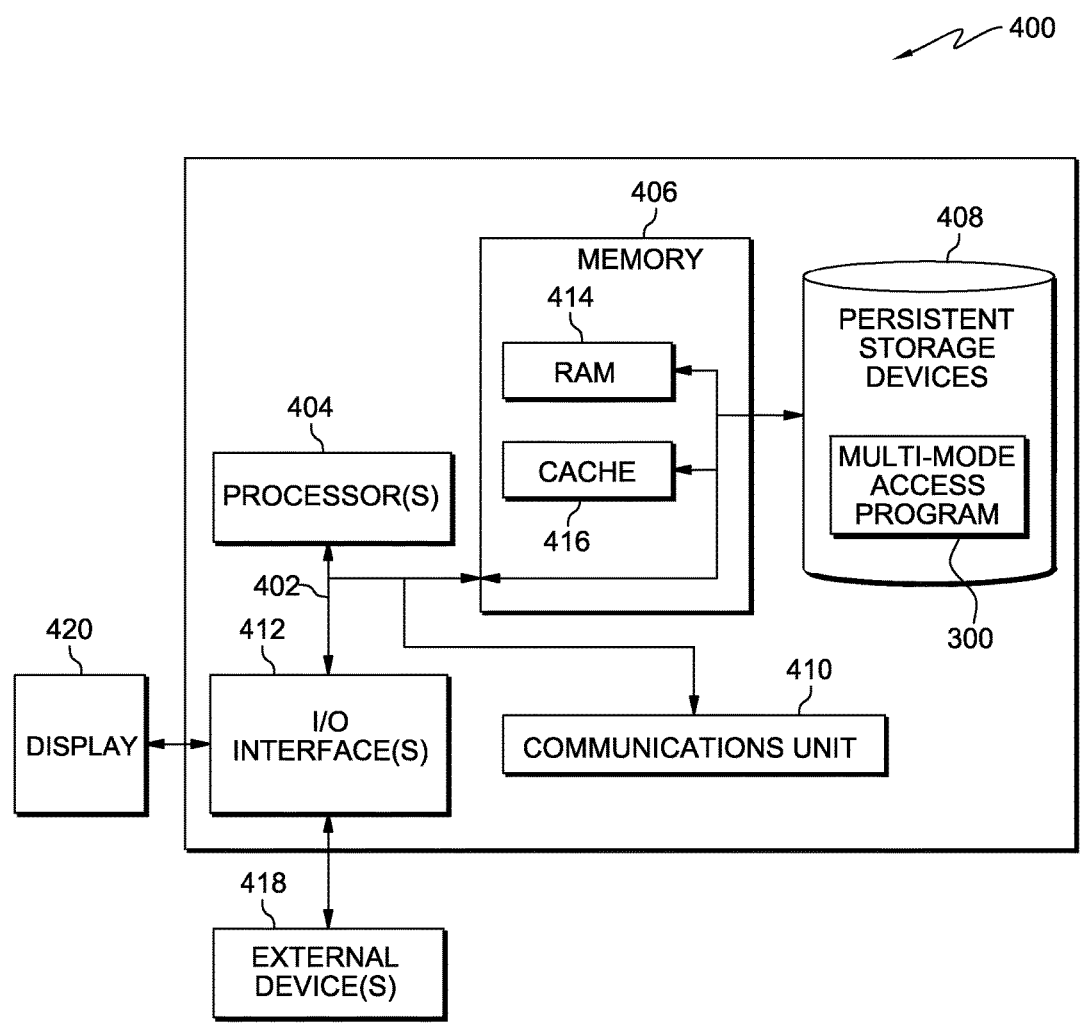
FIG. 4 depicts a block diagram of components of a transaction server computer capable of performing the operational steps of a multi-mode access program, in accordance with an embodiment of the present invention.

FIG. 4 depicts a block diagram of components of transaction server 400, capable of performing the operational steps of multi-mode access program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Transaction server 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Multi-mode access program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed communications environment 100 and client devices 110, 112, and 114. In these examples, communications unit 410 includes one or more network interface cards. Communications unit 410 may provide communications through the use of either or both physical and wireless communications links. Multi-mode access program 300 may be downloaded to persistent storage 408 through communications unit 410.

I/O interface(s) 412 allows for input and output of data with other devices that may be connected to transaction server 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., multi-mode access program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, executable by one or more computer processors, for improving electronic transactions by enabling a first communication mode on a first communication device, and at least one additional communication mode on at least one additional communication device during a transaction to enhance customer service through transaction flexibility and support, the method comprising:
   wherein the first communication device and the at least one additional communication device are client devices, and wherein the first communication mode and the at least one additional communication mode are communication modes supported by the first communication device and the at least one additional communication device;
   receiving, by the one or more computer processors, a global command from the first communication device using the first communication mode associated with a transaction via a network, wherein receipt of the global command enables the first communication mode through a first application program interface (first API), and the at least one additional communication mode through a second application program interface (second API) for use during the transaction, wherein the first API is a web API and the second API is a wireless API;
   storing, by the one or more computer processors, transaction data in memory coupled to the one or more computer processors, wherein the transaction data is stored for at most a duration of a session life span (SLS) time interval;
   sending, by the one or more computer processors, a transfer session identifier (TSI) key to the first communication device using the first communication mode through the first API, where the TSI key is a four to six digit integer;

receiving, by the one or more computer processors, the TSI key from at least one additional communication device, where the at least one additional communication device is designated and assigned to a user, using at least one additional communication mode through the second API during the SLS time interval, wherein the SLS time interval is a pre-defined period of time when the TSI key is to be received by the at least one additional communication device through the second API;

enabling, by the one or more computer processors, the second API for the at least one additional communication mode on the at least one additional communication device, wherein enabling includes assigning the at least one communication mode to the second API by matching the at least one communication mode for an activity to an appropriate API for the activity, where the activity is voice communication;

associating, by the one or more computer processors, the at least one additional communication device with the transaction via the at least one additional communication mode through the second API that received the TSI key;

associating, by the one or more computer processors, the transaction data with the at least one additional communication mode and the first communication mode, such that the at least one additional communication mode through the second API and the first communication mode through the first API are both active during the SLS time interval;

performing, by the one or more computer processors, the transaction in response to input from both of the first communication device using the first communication mode through the first API and the at least one additional communication device using the at least one additional communication mode through the second API, within the SLS time interval;

alerting, by the one or more computer processors, that the SLS time interval is about to expire, wherein alerting includes displaying a warning message on the first communication device using the first communication mode through the first API and the at least one additional communication device using the at least one additional communication mode through the second API; and responsive to a determination that no transaction terminating action has been taken, presenting, by the one or more computer processors, an activity option to begin a second transaction on the first communication device and the at least one additional communication device based, at least in part, on receiving an additional TSI from the at least one additional communication mode, wherein presenting the activity option includes temporarily saving the transaction data accrued for the transaction on a temporary data store for a designated time interval, and sending the additional TSI to the at least one additional communication device, such that the stored transaction data is available to the first communication mode and the at least one additional communication mode associated with the transaction via the additional TSI.

2. The method of claim 1, further comprising:
terminating, by the one or more computer processors, at least one of the first communication mode and at least the second communication mode in response to receiving a user selection of an activity option for terminating the transaction, wherein terminating at least one of the first communication mode and the at least one additional communication mode includes disabling and dissociating the at least one of the first communication mode and the at least one additional communication mode selected for termination from the transaction data.

3. The method of claim 1, wherein receiving the global command and the TSI key from the first communication device using the first communication mode includes using the first API, wherein the first API includes a global application programming interface, wherein the global application programming interface enables selection of the plurality of communication modes.

4. The method of claim 1, further comprising:
proceeding, by the one or more computer processors, with the transaction in response to receiving the TSI key through the second API of the at least one additional communication mode within the SLS time period.

5. The method of claim 1, further comprising:
proceeding, by the one or more computer processors, with the transaction in response to detecting activity associated with the transaction through the second API of the at least one additional communication mode within the SLS time period.

6. The method of claim 1, wherein the transaction data is deleted in response to an expiration of the SLS time interval that is pre-defined.

7. The method of claim 1, wherein the transaction data includes the TSI key associated with the global command, information associated with a session in which the transaction is performed, data received from the first communication mode and the at least one additional communication mode associated with the transaction, data output to the first communication mode and the at least one additional communication mode associated with the transaction, and one or more transaction steps.

8. The method of claim 1, wherein the first communication mode and the at least one additional communication mode associated with the transaction converge to a single communication mode based on a terminating action received from the first communication device and the at least one additional communication device associated with the transaction.

9. A computer program product for improving electronic transactions by enabling a first communication mode on a first communication device, and at least one additional communication mode on at least one additional communication device during a transaction to enhance customer service through transaction flexibility and support, the computer program product comprising:

a computer-readable storage memory, having computer readable program code embodied therewith, the computer readable program code comprising:

wherein the first communication device and the at least one additional communication device are client devices, and wherein the first communication mode and the at least one additional communication mode are communication modes supported by the first communication device and the at least one additional communication device;

computer readable program code configured to receive a global command from the first communication device using the first communication mode associated with a transaction via a network, wherein receipt of the global command enables the first communication mode through a first application program interface (first API), and the at least one additional communication mode through a second application program interface (second API) for use during the transaction, wherein the first API is a web API and the second API is a wireless API;

computer readable program code configured to transaction data in memory coupled to the one or more computer processors, wherein the transaction data is stored for at most a duration of a session life span (SLS) time interval;

computer readable program code configured to send a transfer session identifier (TSI) key to the first communication device using the first communication mode through the first API, where the TSI key is a four to six digit integer;

computer readable program code configured to receive the TSI key from at least one additional communication device, where the at least one additional communication device is designated and assigned to a user, using at least one additional communication mode through the second API during the SLS time interval, wherein the SLS time interval is a pre-defined period of time when the TSI key is to be received by the at least one additional communication device through the second API;

computer readable program code configured to enable the second API for the at least one additional communication mode on the at least one additional communication device, wherein enabling includes assigning the at least one communication mode to the second API by matching the at least one communication mode for an activity to an appropriate API for the activity, where the activity is voice communication;

computer readable program code configured to associate the transaction data with the at least one additional communication mode and the first communication mode such that the at least one additional communication mode and the first communication mode are both active during the SLS time interval;

computer readable program code configured to perform the transaction in response to input from both of the first communication device using the first communication mode through the first API and the at least one additional communication device using the at least one additional communication mode through the second API, within the SLS time interval;

computer readable program code configured to alert that the SLS time interval is about to expire, wherein alerting includes displaying a warning message on the first communication device using the first communication mode through the first API and the at least one additional communication device using the at least one additional communication mode through the second API; and responsive to a determination that no transaction terminating action has been taken, computer readable program code configured to present an activity option to begin a second transaction on the first communication device and the at least one additional communication device based, at least in part, on receiving an additional TSI from the at least one additional communication mode, wherein presenting the activity option includes temporarily saving the transaction data accrued for the transaction on a temporary data store for a designated time interval, and sending the additional TSI to the at least one additional communication device, such that the stored transaction data is available to the first communication mode and the at least one additional communication mode associated with the transaction via the additional TSI.

10. The computer program product of claim 9, further comprising:

computer readable program code configured to terminate at least one of the first communication mode and at least the second communication mode in response to receiving a user selection of an activity option for terminating the transaction, wherein terminating at least one of the first communication mode and the at least one additional communication mode includes disabling and dissociating the at least one of the first communication mode and the at least one additional communication mode selected for termination from the transaction data.

11. The computer program product of claim 9, wherein receiving the global command and the TSI key from the first communication device using the first communication mode includes using the first API, wherein the first API includes a global application programming interface, wherein the global application programming interface enables selection of the plurality of communication modes.

12. The computer program product of claim 9, further comprising:

computer readable program code configured to proceed with the transaction in response to receiving the TSI key through the second API of the at least one additional communication mode within the SLS time period.

13. The computer program product of claim 9, further comprising:

computer readable program code configured to proceed with the transaction in response to detecting activity associated with the transaction through the second API of the at least one additional communication mode within the SLS time period.

14. The computer program product of claim 9, wherein the first communication mode and the at least one additional communication mode associated with the transaction converge to a single communication mode based on a terminating action received from the first communication device and the at least one additional communication device associated with the transaction.

15. A computer system for improving electronic transactions by enabling a first communication mode on a first communication device, and at least one additional communication mode on at least one additional communication device during a transaction to enhance customer service through transaction flexibility and support, the computer system comprising:

one or more computer processors;

one or more computer-readable storage memory;

program instructions stored on the one or more computer-readable storage memory for execution by at least one of the one or more processors, the program instructions comprising:

wherein the first communication device and the at least one additional communication device are client devices, and wherein the first communication mode and the at least one additional communication mode are communication modes supported by the first communication device and the at least one additional communication device;

program instructions to receive a global command from the first communication device using the first communication mode associated with a transaction via a network, wherein receipt of the global command enables the first communication mode through a first application program interface (first API), and the at least one additional communication mode through a second application program interface (second API) for use during the transaction, wherein the first API is a web API and the second API is a wireless API;

program instructions to transaction data in memory coupled to the one or more computer processors, wherein the transaction data is stored for at most a duration of a session life span (SLS) time interval;

program instructions to send a transfer session identifier (TSI) key to the first communication device using the first communication mode through the first API, where the TSI key is a four to six digit integer;

program instructions to receive the TSI key from at least one additional communication device, where the at least one additional communication device is designated and assigned to a user, using at least one additional communication mode through the second API during the SLS time interval, wherein the SLS time interval is a pre-defined period of time when the TSI key is to be received by the at least one additional communication device through the second API;

program instructions to enable the second API for the at least one additional communication mode on the at least one additional communication device, wherein enabling includes assigning the at least one communication mode to the second API by matching the at least one communication mode for an activity to an appropriate API for the activity, where the activity is voice communication;

program instructions to associate the transaction data with the at least one additional communication mode and the first communication mode such that the at least one additional communication mode and the first communication mode are both active during the SLS time interval;

program instructions to perform the transaction in response to input from both of the first communication device using the first communication mode through the first API and the at least one additional communication device using the at least one additional communication mode through the second API, within the SLS time interval;

program instructions to alert that the SLS time interval is about to expire, wherein alerting includes displaying a warning message on the first communication device using the first communication mode through the first API and the at least one additional communication device using the at least one additional communication mode through the second API; and responsive to a determination that no transaction terminating action has been taken, program instructions to present an activity option to begin a second transaction on the first communication device and the at least one additional communication device based, at least in part, on receiving an additional TSI from the at least one additional communication mode, wherein presenting the activity option includes temporarily saving the transaction data accrued for the transaction on a temporary data store for a designated time interval, and sending the additional TSI to the at least one additional communication device, such that the stored transaction data is available to the first communication mode and the at least one additional communication mode associated with the transaction via the additional TSI.

16. The computer system of claim 15 further comprising:
program instructions to terminate at least one of the first communication mode and at least the second communication mode in response to receiving a user selection of an activity option for terminating the transaction, wherein terminating at least one of the first communication mode and the at least one additional communication mode includes disabling and dissociating the at least one of the first communication mode and the at least one additional communication mode selected for termination from the transaction data.

17. The computer system of claim 15, the global command and the TSI key from the first communication device using the first communication mode includes using the first API, wherein the first API includes a global application programming interface, wherein the global application programming interface enables selection of the plurality of communication modes.

18. The computer system of claim 15, wherein the transaction data is deleted in response to an expiration of the SLS time interval that is pre-defined.

19. The computer system of claim 15, wherein the transaction data includes the TSI key associated with the global command, information associated with a session in which the transaction is performed, data received from the first communication mode and the at least one additional communication mode associated with the transaction, data output to the first communication mode and the at least one additional communication mode associated with the transaction, and one or more transaction steps.

20. The computer system of claim 15, wherein the first communication mode and the at least one additional communication mode associated with the transaction converge to a single communication mode based on a terminating action received from the first communication device and the at least one additional communication device associated with the transaction.

* * * * *